United States Patent
Takagi et al.

(10) Patent No.: US 11,820,270 B2
(45) Date of Patent: Nov. 21, 2023

(54) ASSIST GRIP STRUCTURE

(71) Applicant: HONDA MOTOR CO., LTD., Tokyo (JP)

(72) Inventors: Yozo Takagi, Wako (JP); John McDougall, Warren, MI (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/680,580

(22) Filed: Feb. 25, 2022

(65) Prior Publication Data
US 2022/0297585 A1    Sep. 22, 2022

(30) Foreign Application Priority Data

Mar. 19, 2021  (JP) ................................. 2021-046576

(51) Int. Cl.
*B60N 3/02*  (2006.01)
*B60N 3/10*  (2006.01)

(52) U.S. Cl.
CPC ............... *B60N 3/02* (2013.01); *B60N 3/101* (2013.01)

(58) Field of Classification Search
CPC ........... B60N 3/02; B60N 3/026; B60N 3/101
USPC ....................................... 296/1.02, 152, 153
See application file for complete search history.

(56) References Cited

U.S. PATENT DOCUMENTS

| 4,072,339 A * | 2/1978 | Rothlisberger | B60N 3/02 280/181 |
| 6,523,879 B2 * | 2/2003 | Mizuta | B60N 3/02 296/193.06 |
| 7,744,141 B2 * | 6/2010 | Saionji | B60N 3/023 49/461 |
| 8,662,581 B1 * | 3/2014 | Behbehani | B60N 3/12 297/411.27 |
| 11,479,273 B2 * | 10/2022 | Hattori | B61D 23/00 |

(Continued)

FOREIGN PATENT DOCUMENTS

| CN | 107444225 A | * 12/2017 | ............. B60N 3/101 |
| EP | 2006150 A2 | * 12/2008 | ........... B60N 2/2806 |

(Continued)

OTHER PUBLICATIONS

Japanese Office Action received in corresponding Japanese application No. 2021-046576 dated Jan. 17, 2023 with English translation (6 pages).

*Primary Examiner* — Amy R Weisberg
*Assistant Examiner* — Kevin P Weldon
(74) *Attorney, Agent, or Firm* — Rankin, Hill & Clark LLP

(57) ABSTRACT

An assist grip structure is made for a vehicle, including an opening portion formed in a side surface of the vehicle and a sliding door configured to slide in a vehicle front-rear direction to open and close the opening portion. The assist grip structure is attached to a side edge defining the opening portion at a position closer to an inner end in a vehicle width direction of the side edge and overlapping in the vehicle width direction with the opened sliding door. The assist grip structure includes: a grip part extending in a vehicle up-down direction; an extending part extending from the grip part toward an opening direction of the sliding door; and a cup holder provided at a position ahead, in the opening direction of the sliding door, of the grip part and interior, in the vehicle width direction, to the extending part.

16 Claims, 5 Drawing Sheets

(56) References Cited

U.S. PATENT DOCUMENTS

| | | | | |
|---|---|---|---|---|
| 11,613,190 B2* | 3/2023 | Sakurai | ............ | B60N 2/763 |
| | | | | 296/153 |
| 11,613,195 B2* | 3/2023 | Sakurai | ............ | B60J 5/062 |
| | | | | 16/110.1 |
| 2013/0020821 A1* | 1/2013 | Abe | ............ | B60N 3/02 |
| | | | | 296/1.02 |
| 2013/0026776 A1* | 1/2013 | Abe | ............ | B60N 3/023 |
| | | | | 296/1.02 |
| 2020/0339023 A1* | 10/2020 | Nakamura | ............ | B60J 5/0487 |

FOREIGN PATENT DOCUMENTS

| | | | |
|---|---|---|---|
| JP | 2002-356123 A | | 12/2002 |
| JP | 2010-195356 A | | 9/2010 |
| JP | 2019-073121 A | | 5/2019 |
| KR | 0132832 Y1 | * | 12/1998 |

\* cited by examiner

ASSIST GRIP STRUCTURE

CROSS-REFERENCE TO RELATED APPLICATION

The present application claims the benefit of priority to Japanese Patent Application No. 2021-046576 filed on Mar. 19, 2021, the disclosures of all of which are hereby incorporated by reference in their entireties.

TECHNICAL FIELD

The present disclosure relates to an assist grip structure.

BACKGROUND

A conventional assist grip structure has a component, integrally formed of an assist grip and a cup holder, attached to a rear surface of a seatback (see Japanese Patent Application Publication No. 2019-073121, for example).

A seat of a vehicle is equipped with the seatback and a seatback table provided on a rear surface of the seatback. The seatback table has a substantially flat-shaped table part, an edge part formed at an outer edge of the table part and thicker than the table part, an opening formed at a position adjacent to the edge part, and a grip part provided at a position adjacent to the opening.

The conventional assist grip structure is provided on the rear surface of the seatback, assuming that a passenger P uses the grip part, by holding the part, when getting into the vehicle. However, the assist grip structure is not assumed to be used by the passenger P when the passenger P gets off the vehicle.

In addition, when the passenger P uses the assist grip to get into the vehicle, there arises a problem that the passenger P has less space for getting into the vehicle.

The present disclosure is intended to provide an assist grip structure which is convenient when a passenger gets in and off a vehicle and improves space efficiency inside the vehicle.

SUMMARY

An assist grip structure of the present disclosure is an assist grip for a vehicle, including an opening portion formed in a side surface of the vehicle and a sliding door configured to slide in a vehicle front-rear direction to open and close the opening portion, attached to a side edge defining the opening portion at a position closer to an inner end in a vehicle width direction of the side edge and overlapping in the vehicle width direction with the opened sliding door, and includes: a grip part extending in a vehicle up-down direction; an extending part extending from the grip part toward an opening direction of the sliding door; and a cup holder provided at a position ahead, in the opening direction of the sliding door, of the grip part and interior, in the vehicle width direction, to the extending part.

According to the present disclosure, an assist grip structure is provided, which is convenient when a passenger gets in and off the vehicle and improves space efficiency inside the vehicle.

DETAILED DESCRIPTION

A description is given of an embodiment of the present disclosure with reference to the drawings as appropriate. The same components are denoted by the same reference signs, and the duplicate descriptions are omitted. Directions are described, when required, basically based on a front-rear direction, a right-left direction, and an up-down direction, as viewed from a driver, unless otherwise indicated. Also, a "vehicle width direction" indicates the "right-left direction".

First, a description is given of a structure of an assist grip structure.

Figure 1:
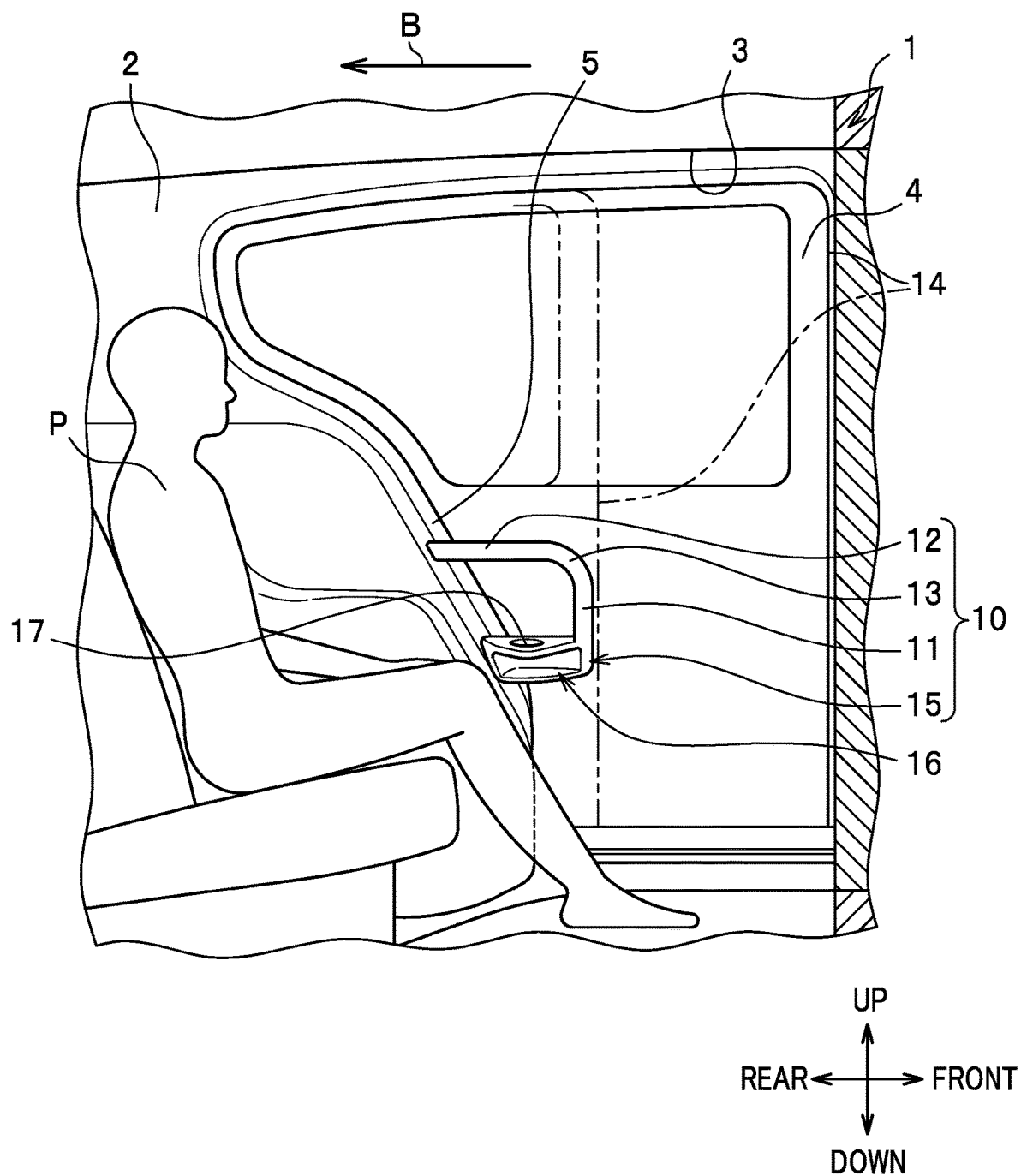
FIG. 1 is a schematic side view of an assist grip structure of an embodiment of the present disclosure, illustrating a positional relationship between an assist grip provided inside a vehicle and a sliding door for a left seat.

As shown in FIG. 1, a vehicle 1 has one or more opening portions 3 for doors formed in left and right side surfaces 2 thereof. The opening portions 3 for doors in the side surface 2 are provided thereat with front and rear doors, respectively. In the present embodiment, for the purpose of describing the assist grip structure, a peripheral edge of a sliding door 4, which is a left rear door of the vehicle 1, is described. Note that a right rear door of the vehicle 1 is symmetrical to the left rear sliding door 4, and the description thereof is omitted.

Figure 2:
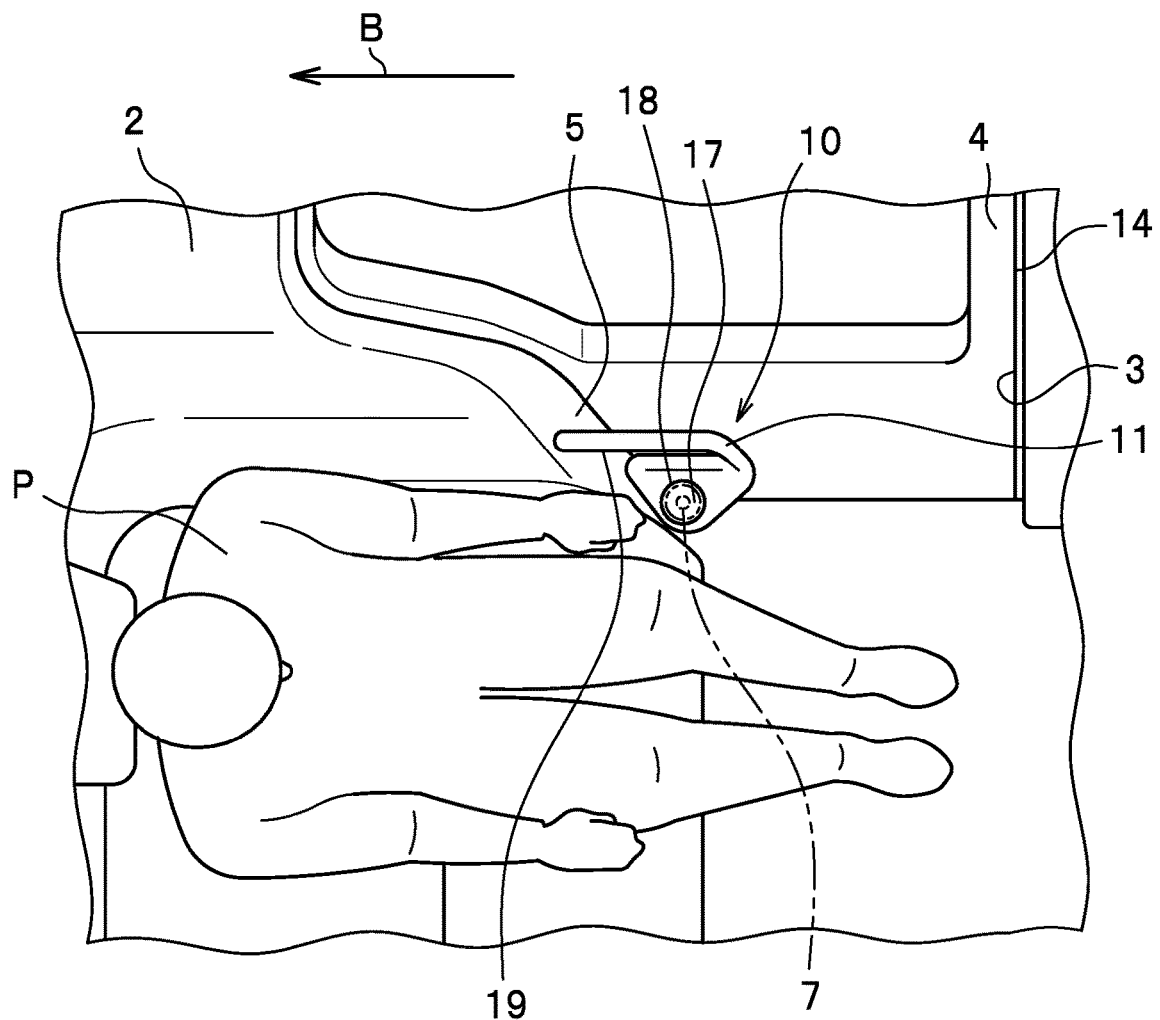
FIG. 2 is a schematic plan view of the assist grip structure of the present embodiment, illustrating the positional relationship between the assist grip provided inside the vehicle and the sliding door for the left seat.
Figure 2:
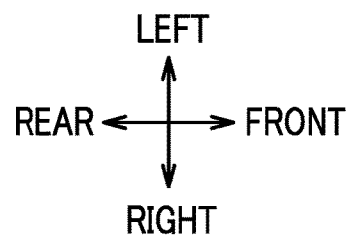

As shown in FIG. 2, the vehicle 1 of the present embodiment has the opening portion 3 formed in the left side surface 2, the sliding door 4 which is slid in the front-rear direction to open and close the opening portion 3, and an assist grip 10 attached to a side edge 5 defining the opening portion 3 at a position closer to an inner end in a vehicle width direction of the side edge 5 and overlapping in the vehicle width direction with the opened sliding door 4. The sliding door 4 of the present embodiment is moved rearward to open the opening portion 3 and is moved forward to close the opening portion 3. In the following description, "rearward" may be referred to as an "opening direction" and "frontward" may be referred to as a "closing direction".

Figure 3:
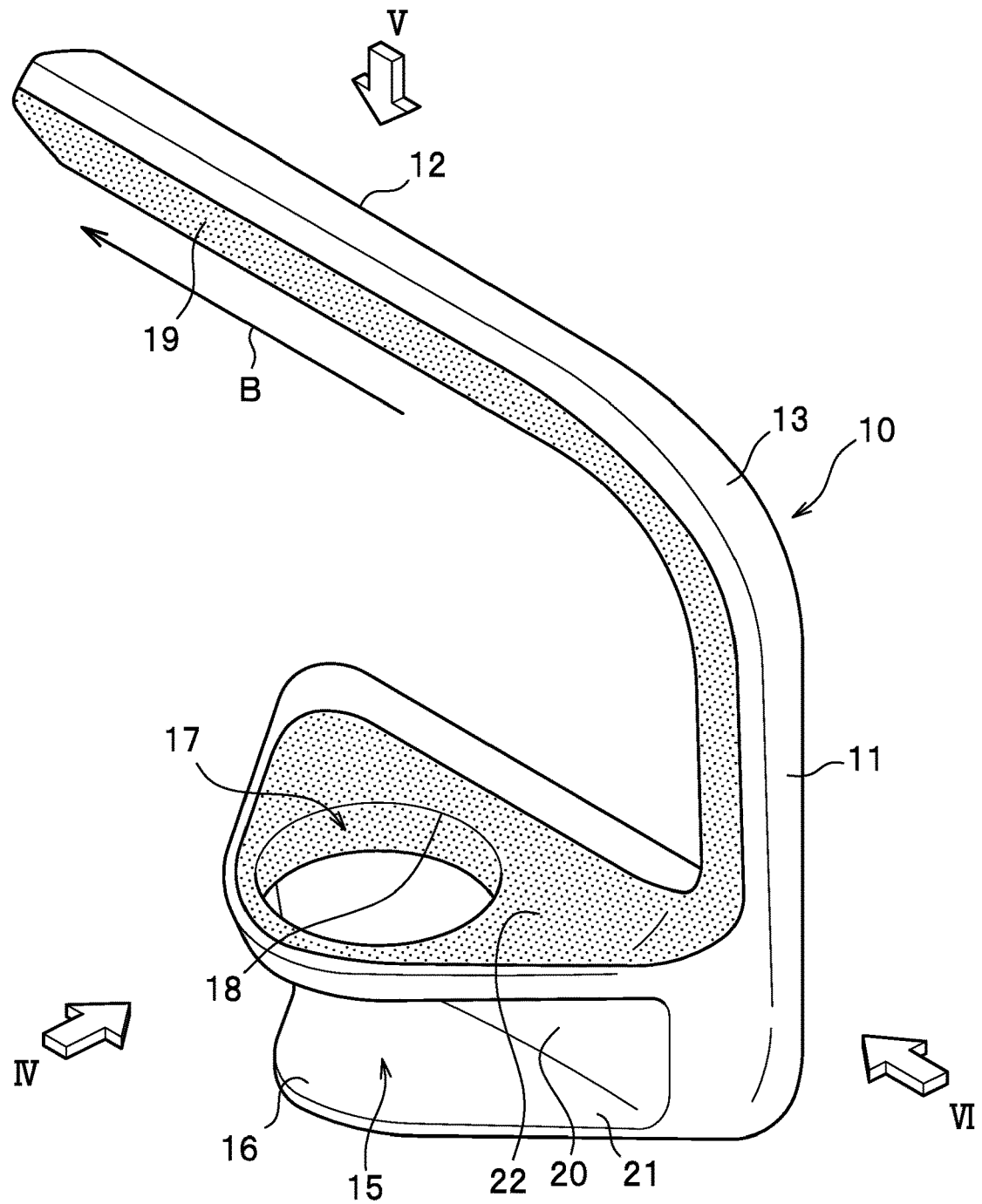
FIG. 3 is a perspective view of the assist grip structure of the present embodiment, illustrating a structure of the assist grip.
Figure 3:
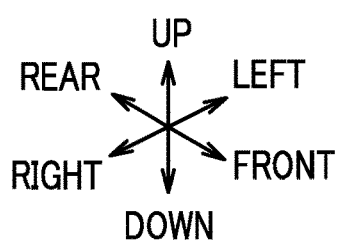

As shown in FIG. 3, the assist grip 10 includes a rod-shaped grip part 11 extending in the vehicle up-down direction, an extending part 12 extending from the grip part 11 toward an opening direction B of the sliding door 4, and a cup holder 15 provided at a position ahead, in the opening direction B of the sliding door 4, of the grip part 11 and interior, in the vehicle width direction, to the extending part 12.

Figure 4:
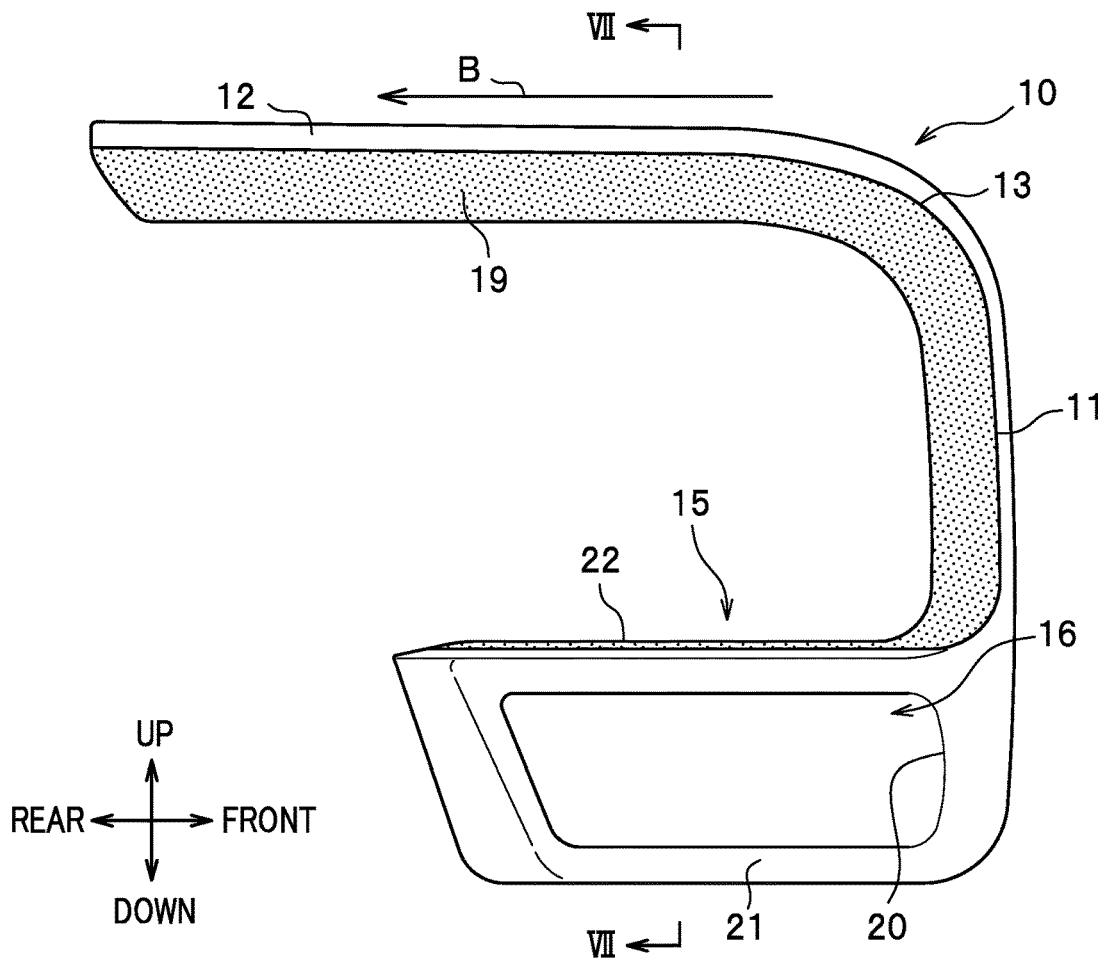
FIG. 4 is a side view of the assist grip structure of the present embodiment, illustrating the structure of the assist grip, as viewed from an arrowed direction IV in FIG. 3.
Figure 7:
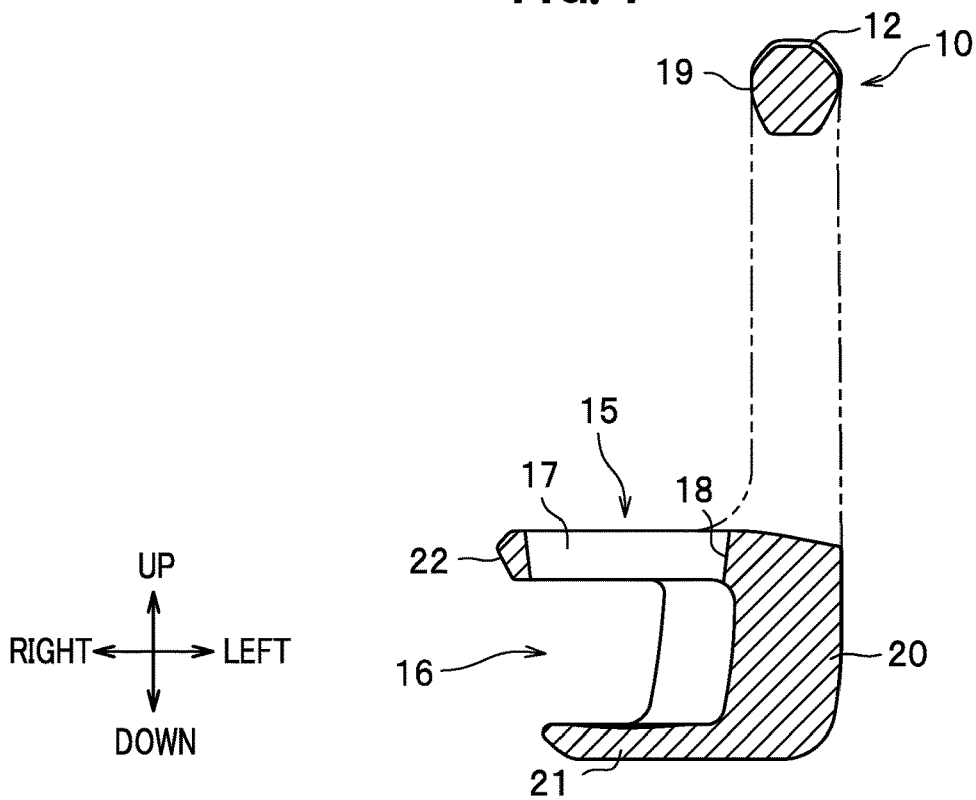
FIG. 7 is a cross-sectional view of the assist grip structure of the present embodiment, as viewed along a line VII-VII in FIG. 4.

As shown in FIG. 4, the grip part 11 and the extending part 12 are each formed in a rod-shape having approximately the same diameter (see FIG. 7).

Further, as shown in FIG. 3, the extending part 12 extends from an upper portion of the grip part 11 toward the opening direction B of the sliding door 4 (see FIG. 1). A tip of the extending part 12 is connected to the side edge 5 of the opening portion 3 at a position posterior to the cup holder 15 (see FIG. 2). The grip part 11 and the extending part 12 are provided with a predetermined gap on the inner side in the vehicle width direction of the sliding door 4 so as not to interfere with an inner surface of the sliding door 4 even when the sliding door 4 is slid to open and close.

In addition, the grip part 11 is provided with a curve-shaped bent part 13 at a connection with the extending part 12. Thus, the grip part 11 of the present embodiment is connected, to be in one piece, with the extending part 12 extending along the opening direction B of the sliding door 4 via the curve-shaped bent part 13.

Figure 5:
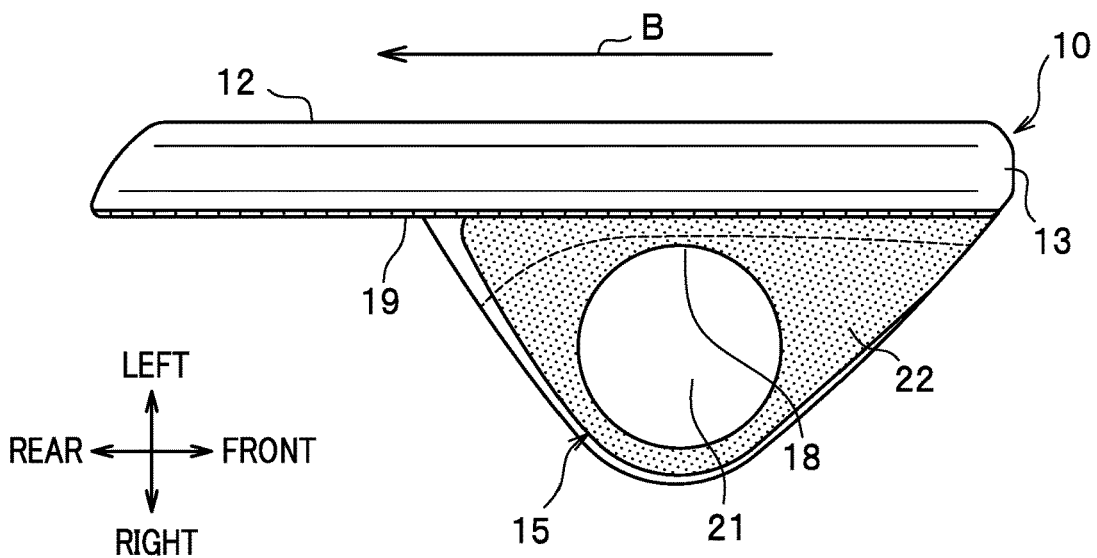
FIG. 5 is a top view of the assist grip structure of the present embodiment, illustrating the structure of the assist grip, as viewed from an arrowed direction V in FIG. 3.
Figure 6:
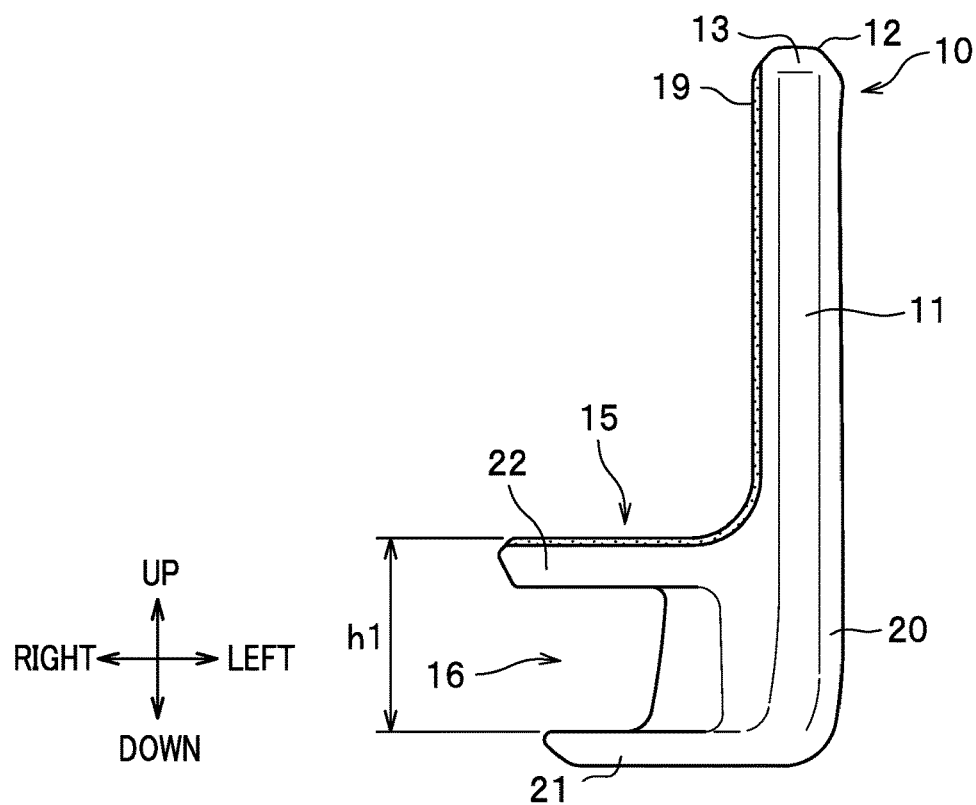
FIG. 6 is a front view of the assist grip structure of the present embodiment, illustrating the structure of the assist grip, as viewed from an arrowed direction VI in FIG. 3.

As shown in FIGS. 3 and 5, the cup holder 15 of the present embodiment includes a side-surface holding part 22 having a substantially triangular shape in a plan view, a bottom-surface holding part 21 having a substantially triangular shape in a plan view, which has a substantially similar shape to the side-surface holding part 22 shown in FIG. 6, and a coupling part 20 to couple the side-surface holding part 22 with the bottom-surface holding part 21 in parallel, which are spaced apart from each other in the up-down direction.

As shown in FIG. 6, the cup holder 15 of the present embodiment has an opening 16 to open inward in the vehicle width direction. The opening 16 is defined by the side-surface holding part 22 and the bottom-surface holding part 21, to have a predetermined gap h1 in the up-down direction therebetween.

As shown in FIGS. 3 and 7, the side-surface holding part 22 of the cup holder 15 has an insertion hole 17 through which a beverage container 7 (see FIG. 2) is inserted. An outer end 18 in the vehicle width direction of the insertion hole 17 in the present embodiment is located interior, in the vehicle width direction, to an inner end 19 in the vehicle width direction of the extending part 12.

As shown in FIG. 3, the bottom-surface holding part 21 can be seen from above, when the beverage container 7 is not accommodated in the cup holder 15. Here, a color of the side-surface holding part 22 is different from that of the bottom-surface holding part 21. In the present embodiment, the color of the side-surface holding part 22 is a dark color, such as black, and the color of the bottom-surface holding part 21 is a light color, such as white, which is different from that of the side-surface holding part 22.

Further, as shown in FIGS. 3 and 4, the cup holder 15 includes, at an outer portion thereof in the vehicle width direction, the coupling part 20 to couple the side-surface holding part 22 with the bottom-surface holding part 21. A color of the coupling part 20 is white, which is selected from the color of the side-surface holding part 22 (black) and the color of the bottom-surface holding part 21 (white), as a different color from the color of the side-surface holding part 22.

Further, the side-surface holding part 22 of the present embodiment is formed of an elastic member made of rubber. Therefore, a peripheral edge of the opening 16 of the side-surface holding part 22 is configured to be in elastic contact with a periphery of the beverage container 7 inserted through the opening 16.

Further, as shown in FIG. 1, the grip part 11 is provided ahead, in the opening direction B of the sliding door 4, of a side end 14, in a direction opposite to the opening direction B, of the sliding door 4, in a state where the sliding door 4 has been slid in the opening direction B and fully opened (see double-dotted chain line in FIG. 1).

As described above, as shown in FIG. 1, the assist grip structure of the present embodiment is the assist grip 10 for the vehicle 1, including the opening portion 3 formed in the side surface 2 of the vehicle 1, and the sliding door 4 configured to slide in the vehicle front-rear direction to open and close the opening portion 3, attached to the side edge 5 defining the opening portion 3 at a position closer to the inner end in the vehicle width direction of the side edge 5 and overlapping in the vehicle width direction with the opened sliding door 4.

The assist grip 10 includes the grip part 11 extending in the vehicle up-down direction, the extending part 12 extending from the grip part 11 toward the opening direction B of the sliding door 4, and the cup holder 15 provided at a position ahead, in the opening direction B of the sliding door 4, of the grip part 11 and interior, in the vehicle width direction, to the extending part 12.

The assist grip structure of the present embodiment configured as described above is convenient when a passenger P gets in and off the vehicle, and improves space efficiency inside the vehicle.

Specifically, as shown in FIG. 1, the assist grip 10 is attached in a vehicle interior to, at a position closer to an inner end in the vehicle width direction of, the side edge 5 located at a peripheral edge defining the opening portion 3 of the sliding door 4 (see FIG. 2). Thus, the grip part 11 can be attached at a position where the passenger P can easily grip to support his/her body when getting in and off the vehicle.

In addition, the cup holder 15 is provided in the assist grip 10, which is used when the passenger P gets in and off the vehicle. This eliminates the need of separately providing the cup holder 15 as a separate component, to improve space efficiency inside the vehicle.

Further, the beverage container 7 held in the cup holder 15 is easily visible when the passenger P gets off the vehicle (see FIG. 2). Therefore, a risk of the passenger forgetting the beverage container 7 is reduced.

As a comparative example, assuming that the cup holder 15 is provided on a door trim, for example, interference with surrounding components such as a seat has to be considered when the sliding door 4 is slid. For example, to prevent interference, it is necessary to provide the cup holder 15 in vicinity to a side edge in the closing direction of the sliding door 4 (that is, a front edge). In this case, when the sliding door 4 is closed, the cup holder 15 is far away from a reach of the passenger P, making it difficult to take out the beverage container 7. As a result, there is a problem of reduced convenience of use.

In contrast, the assist grip structure of the present embodiment is the assist grip 10 including the cup holder 15 in the vehicle interior, at a position closer to an inner end in the vehicle width direction of the side edge 5, defining the opening portion 3 for the sliding door 4, and overlapping in the vehicle width direction with the opened sliding door 4. Therefore, even when the sliding door 4 is closed, the cup holder 15 to accommodate the beverage container 7 is located within a reach of the passenger P. Accordingly, the passenger P can reach the beverage container 7 while seated, without taking any improper postures, such as bending his/her upper body toward a front of the vehicle.

Further, in the assist grip structure of the present embodiment, the cup holder 15 is provided at a position ahead, in the opening direction B of the sliding door 4, of the grip part 11 (see FIG. 1) and interior, in the vehicle width direction, to the extending part 12 (see FIG. 2). This prevents the cup holder 15 from interfering with use of the grip part 11. Still further, as shown in FIG. 1, the cup holder 15 is surrounded, at a top end and a lateral end thereof, by the grip part 11, the bent part 13, and the extending part 12 of the assist grip 10, so as to have a substantially L-shape in a side view.

Thus, the cup holder 15 is guarded by the assist grip 10. This reduces a risk of accidental contact, when the passenger P gets in and off the vehicle or puts in and out a piece of baggage.

As shown in FIG. 2, the cup holder 15 has the insertion hole 17 through which the beverage container 7 is inserted. The outer end 18 in the vehicle width direction of the insertion hole 17 is positioned interior, in the vehicle width direction, to the inner end 19 in the vehicle width direction of the extending part 12.

Thus, as in the present embodiment, even in the case where the cup holder 15 is located below the extending part 12, a risk of interference with the grip part 11 or the extending part 12 is reduced when the beverage container 7 is taken out through the insertion hole 17. Therefore, the cup holder 15 can be further convenient.

Further, as shown in FIG. 3, the extending part 12 extends from the upper of the grip part 11 toward the opening direction B of the sliding door 4.

In the present embodiment, the extending part 12 extending from the upper of the grip part 11 toward the opening direction B of the sliding door 4 is located above an upper end of the beverage container 7 accommodated in the cup holder 15. Therefore, the assist grip 10 can be used in various ways, such that the grip part 11 is gripped from the side, or the extending part 12 is gripped from above and below as a second grip part. In this way, the assist grip 10 can be used in various ways without interfering with the beverage container 7, to improve usability of the assist grip 10 when the passenger P gets in and off the vehicle.

Further, as shown in FIG. 2, the grip part 11 is provided with the bent part 13 at the connection with the extending part 12. In the assist grip structure of the present embodiment, the bent part 13 can be gripped at an angle, as a third gripping part, and this is convenient. This further improves usability of the assist grip 10.

Still further, the cup holder 15 to accommodate the beverage container 7 is provided ahead, in the opening direction B of the sliding door 4, of the grip part 11. Therefore, the cup holder 15 is separated from the bent part 13, to prevent the bent part 13 from interfering with the cup holder 15 when the cup holder 15 is used.

As shown in FIG. 5, the bottom-surface holding part 21 can be seen from above when the beverage container 7 is not accommodated in the cup holder 15. In this case, the color of the side-surface holding part 22 is different from that of the bottom-surface holding part 21.

For this reason, when the side-surface holding part 22 is seen from above, a difference in color between the side-surface holding part 22 and the bottom-surface holding part 21 is visually recognized with high contrast and the side-surface holding part 22 can be easily distinguished. Therefore, the passenger P can easily recognize the position where the beverage container 7 is to be accommodated, to improve usability of the cup holder 15.

For example, the cup holder 15 may be provided in the assist grip 10, at a position farther away from the opening portion 3 for the sliding door 4 than the grip part 11, that is, closer within a reach of the hand of the passenger P. The passenger P recognizes that the colors are different between the side-surface holding part 22 and the bottom-surface holding part 21, and easily recognizes the position where the beverage container 7 is to be accommodated.

Further, the cup holder 15 includes the coupling part 20, at the outer portion in the vehicle width direction thereof, to couple the side-surface holding part 22 with the bottom-surface holding part 21. The coupling part 20 is formed to have a color different from at least one of the colors of the side-surface holding part 22 and the bottom-surface holding part 21.

The coupling part 20 is provided to couple the side-surface holding part 22 with the bottom-surface holding part 21. Accordingly, an area of the cup holder 15, in contact with a side surface of the beverage container 7, is increased. Therefore, the cup holder 15 can improve performance of holding the beverage container 7.

Further, the coupling part 20 is colored in white, which is different from the color of the side-surface holding part 22 colored in black, when the side-surface holding part 22 is colored in black and the bottom-surface holding part 21 is colored in white.

Therefore, the coupling part 20 can be more visible due to the contrast from the side-surface holding part 22 or the bottom-surface holding part 21, as compared with a case where the color of the coupling part 20 is the same as that of the bottom-surface holding part 21 or the side-surface holding part 22. Accordingly, when the side-surface holding part 22 is seen from above at an angle, the coupling part 20 in a different color can be recognized. This allows the passenger P to recognize the position of the cup holder 15 more easily, to improve usability.

The side-surface holding part 22 is made of a rubber elastic member.

Accordingly, a force applied at the time of the beverage container 7 being taken in and out is absorbed by elastic deformation of the rubber elastic member forming the side-surface holding part 22. In addition, the side-surface holding part 22 made of rubber absorbs vibrations applied to the beverage container 7 in a state where the beverage container 7 is accommodated while the vehicle is traveling, or vibrations applied to the beverage container 7 due to use of the assist grip 10. This improves noise reduction.

The elastic member made of rubber, forming the side-surface holding part 22, is in contact with the outer periphery of the accommodated beverage container 7 to exert an anti-slip function. Therefore, as shown in FIG. 6, even if the height h1 from the bottom-surface holding part 21 to the side-surface holding part 22 is set small, the beverage container 7 is favorably held.

Further, with the height h1 from the bottom-surface holding part 21 to the side-surface holding part 22 set small, the beverage container 7 is easily taken in and out.

The side-surface holding part 22 can be formed of a material different from that of the bottom-surface holding part 21. In the present embodiment, when different materials are used, the colors thereof can be made different. This allows the passenger P to recognize more easily the position of the cup holder 15 where the beverage container 7 is to be accommodated, and further improves usability of the cup holder 15.

Further, as shown in FIG. 6, the cup holder 15 has the opening 16 to open inward in the vehicle width direction.

In the assist grip structure of the present embodiment, foreign substances such as dust entered in the cup holder 15 are discharged through the opening 16 to an outside of the cup holder 15. Thus, an inner side of the cup holder 15 can be kept clean. In addition, a state, where the passenger P can easily recognize that the side-surface holding part 22 has a color different from that of the bottom-surface holding part 21, is maintained. Accordingly, usability of the cup holder 15 can be further improved.

The grip part 11 is provided ahead, in the opening direction B of the sliding door 4, of the side end 14, in the direction opposite to the opening direction B, of the sliding door 4, in the state where the sliding door 4 has been slid in the opening direction B and fully opened.

Thus, the grip part 11 is provided in the vicinity of the opening portion 3 for the sliding door 4. This allows the passenger P to easily find and grip the grip part 11 when the passenger P gets in and off the vehicle. Therefore, the assist grip 10 is convenient.

Further, as shown in FIG. 1, the grip part 11 is provided ahead, in the opening direction B of the sliding door 4, of the side end 14, in the direction opposite to the opening direction, of the sliding door 4, in the state where the sliding door 4 has been slid in the opening direction B and fully opened.

Therefore, the grip part 11 is positioned to overlap in the vehicle width direction with the sliding door 4 in the state where the sliding door 4 has been opened, and does not protrude into an opening space of the opening portion 3 for the sliding door 4. Therefore, when the passenger P gets in and off the vehicle, or puts in and out a piece of baggage, a risk of the passenger P or the baggage coming into contact with the grip part 11 can be reduced.

The present disclosure is not limited to the embodiment as described above, and various modifications may be made. The embodiment as described above is exemplified for the purpose of illustrating the present disclosure and is not necessarily limited to one having all the components as described above. In addition, a part of one embodiment may be replaced with that of another embodiment, or a part of one embodiment may be added with that of another embodiment. Further, a part of one embodiment may be deleted, or added/replaced with that of another embodiment. Modifications of the above embodiment are, for example, as follows.

The assist grip structure of the embodiment has been described about the sliding door 4, which is the left rear door of the vehicle 1, but is not particularly limited thereto. The assist grip 10 may be provided in vicinity to a right rear door, a right front door, or a left front door.

In other words, arrangements and the number of doors are not particularly limited, as long as the assist grip 10 is provided at a position closer to an inner end in the vehicle width direction of the side edge 5, defining the opening portion 3 for the corresponding door, and overlapping in the vehicle width direction with the opened sliding door 4.

Further, as shown in FIG. 3, the extending part 12 of the present embodiment extends from the upper of the grip part 11 toward the opening direction B of the sliding door 4 and is provided above the cup holder 15. However, the extending part 12b is not particularly limited thereto and may be provided below the cup holder 15, for example.

That is, any one of the extending part 12 and the cup holder 15 may be provided above the other in the up-down direction, as long as the cup holder 15 is provided at a position ahead, in the opening direction B of the sliding door 4, of the grip part 11 and interior, in the vehicle width direction, to the extending part 12.

Further, shapes, the number, and materials of the assist grip 10 and the cup holder 15 are not limited to those of the embodiment as described above.

For example, as shown in FIG. 3, the white bottom-surface holding part 21 can be seen from above, when the beverage container 7 is not accommodated in the cup holder 15, as having different color from that of the side-surface holding part 22, which is colored in black. However, the side-surface holding part 22 is not particularly limited thereto, and may have any color, as long as the color thereof is different from that of the bottom-surface holding part 21.

Further, as shown in FIG. 4, the coupling part 20 of the cup holder 15 is colored in white, which is different from that of the side-surface holding part 22, which is colored in black. However, the coupling part 20 is not particularly limited thereto and may have any color as long as the color thereof is different from that of the side-surface holding part 22.

What is claimed is:

1. An assist grip structure for a vehicle including an opening portion formed in a side surface of the vehicle and a sliding door configured to slide in a vehicle front-rear direction to open and close the opening portion, the assist grip structure attached to a side edge defining the opening portion at a position closer to an inner end in a vehicle width direction of the side edge and overlapping in the vehicle width direction with the opened sliding door, the assist grip structure comprising:
a grip part extending in a vehicle up-down direction;
an extending part extending from the grip part in an opening direction of opening the sliding door; and
a cup holder disposed ahead of the grip part in the opening direction and interior to the extending part in the vehicle width direction,
wherein the cup holder includes a side-surface holding part to hold a side surface of a beverage container and a bottom-surface holding part to hold a bottom surface of the beverage container, and
the side-surface holding part is formed to have a different color from that of the bottom-surface holding part.

2. The assist grip structure as claimed in claim 1, wherein the cup holder has an insertion hole through which a beverage container is inserted, and
an outer end in the vehicle width direction of the insertion hole is located interior, in the vehicle width direction, to an inner end in the vehicle width direction of the extending part.

3. The assist grip structure as claimed in claim 1, wherein the extending part extends from an upper portion of the grip part toward the opening direction of opening the sliding door.

4. The assist grip structure as claimed in claim 1, wherein the grip part includes a bent part at a connection with the extending part.

5. The assist grip structure as claimed in claim 1, wherein the cup holder includes a coupling part, at an outer portion in the vehicle width direction thereof, to couple the side-surface holding part with the bottom-surface holding part, and
the coupling part is formed to have a color different from at least one of the colors of the side-surface holding part and the bottom-surface holding part.

6. The assist grip structure as claimed in claim 1, wherein the side-surface holding part is made of an elastic member.

7. The assist grip structure as claimed in claim 1, wherein the cup holder has an opening to open inward in the vehicle width direction.

8. The assist grip structure as claimed in claim 1, wherein the grip part is disposed ahead of a rearmost side end of the sliding door in a fully opened state in the opening direction.

9. An assist grip structure for a vehicle including an opening portion formed in a side surface of the vehicle and a sliding door configured to slide in a vehicle front-rear direction to open and close the opening portion, the assist grip structure attached to a side edge defining the opening portion at a position closer to an inner end in a vehicle width direction of the side edge and overlapping in the vehicle width direction with the opened sliding door, the assist grip structure comprising:
a grip part extending in a vehicle up-down direction;
an extending part extending from the grip part in an opening direction of opening the sliding door; and
a cup holder disposed ahead of the grip part in the opening direction and interior to the extending part in the vehicle width direction,
wherein the grip part is disposed ahead of a rearmost side end of the sliding door in a fully opened state in the opening direction.

10. The assist grip structure as claimed in claim 9, wherein the cup holder has an insertion hole through which a beverage container is inserted, and
an outer end in the vehicle width direction of the insertion hole is located interior, in the vehicle width direction, to an inner end in the vehicle width direction of the extending part.

11. The assist grip structure as claimed in claim 9, wherein the extending part extends from an upper portion of the grip part toward the opening direction of opening the sliding door.

12. The assist grip structure as claimed in claim 9, wherein the grip part includes a bent part at a connection with the extending part.

13. The assist grip structure as claimed in claim 9, wherein
the cup holder includes a side-surface holding part to hold a side surface of a beverage container and a bottom-surface holding part to hold a bottom surface of the beverage container, and
the side-surface holding part is formed to have a different color from that of the bottom surface holding part.

14. The assist grip structure as claimed in claim 13, wherein
the cup holder includes a coupling part, at an outer portion in the vehicle width direction thereof, to couple the side-surface holding part with the bottom-surface holding part, and
the coupling part is formed to have a color different from at least one of the colors of the side-surface holding part and the bottom-surface holding part.

15. The assist grip structure as claimed in claim 13, wherein the side-surface holding part is made of an elastic member.

16. The assist grip structure as claimed in claim 13, wherein the cup holder has an opening to open inward in the vehicle width direction.

\* \* \* \* \*